United States Patent
Kitano et al.

(10) Patent No.: US 6,709,476 B2
(45) Date of Patent: Mar. 23, 2004

(54) CENTRIFUGAL AIR-OIL SEPARATOR

(75) Inventors: Teruaki Kitano, Saitama (JP); Takaaki Kato, Saitama (JP); Shozo Shiraki, Saitama (JP); Yoshitaka Nishio, Aichi (JP); Kazuki Matsubara, Aichi (JP)

(73) Assignees: Honda Giken Kogyo Kabushiki Kaisha, Tokyo (JP); Denso Corporation, Kariya (JP); Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 10/289,225

(22) Filed: Nov. 7, 2002

(65) Prior Publication Data

US 2003/0106292 A1 Jun. 12, 2003

(30) Foreign Application Priority Data

Nov. 7, 2001 (JP) ........................................ 2001-341541

(51) Int. Cl.[7] .............................................. B01D 45/12
(52) U.S. Cl. .............................. 55/396; 55/423; 55/424; 55/459.1
(58) Field of Search ................................. 55/459.1, 394, 55/423, 466, 396, 424, 426

(56) References Cited

U.S. PATENT DOCUMENTS 2,103,809 A * 12/1937 Bieth ....................... 55/459.1
2,888,096 A * 5/1959 Evans .......................... 55/338
6,475,256 B2 * 11/2002 Matsubara et al. ........... 55/337

FOREIGN PATENT DOCUMENTS

JP            11-264312            9/1999

* cited by examiner

*Primary Examiner*—Robert A. Hopkins
(74) *Attorney, Agent, or Firm*—Armstrong, Kratz, Quintos, Hanson & Brooks, LLP

(57) ABSTRACT

A centrifugal air-oil separator for separating liquid particles from gases containing the liquid particles includes a substantially cylindrical air-oil separation chamber and a substantially conical liquid discharge chamber which are integrated with each other and are horizontally disposed, and an air-oil separation plate disposed between a gas supply port communicating with the air-oil separation chamber and a gas discharge port communicating with the liquid discharge chamber. A liquid discharge port is provided at a lowest portion between a largest-diameter portion of the liquid discharge chamber and the air-oil separation plate, and the liquid discharge port is covered thereabove with a reverse flow prevention wall. A strong swirl flow is generated in the air-oil separation chamber by the action of the air-oil separation plate to thereby enhance the liquid separation effect, and the reverse flow of liquid from the liquid discharge port to the liquid discharge chamber can be prevented.

6 Claims, 3 Drawing Sheets

CENTRIFUGAL AIR-OIL SEPARATOR

BACKGROUND OF THE INVENTION

1. Field of the Invention

The present invention relates to a centrifugal air-oil separator disposed horizontally and including integrally a substantially cylindrical air-oil separation chamber and a substantially conical liquid discharge chamber.

2. Description of the Related Art

Centrifugal air-oil separators are already known to the public through, for example, JP-A-11-264312. A centrifugal air-oil separator disclosed in this Japanese Unexamined Patent Publication is designed to separate oil mist from blow-by gases of an engine and includes an upper air-oil separation chamber and a lower liquid discharge chamber which are disposed with their axes being oriented vertically. When blow-by gases containing oil mist is supplied into the interior of the cylindrical air-oil separation chamber which is situated at an upper position in a tangential direction, a swirl flow is generated, and oil mist separated radially outwardly by virtue of centrifugal force is discharged from a lower end of the conical liquid discharge chamber which is situated at a lower position, whereas the blow-by gases from which the oil mist was separated is discharged upwardly from the center of the air-oil separation chamber.

While the conventional centrifugal air-oil separator is vertically disposed with the axes of the air-oil separation chamber and the liquid discharge chamber being oriented vertically, there sometimes occurs a necessity to dispose the centrifugal air-oil separator horizontally due to the limitation to the mounting space. Even when this occurs, separated liquid must be discharged from the liquid discharge chamber in a smooth fashion.

SUMMARY OF THE INVENTION

The prevent invention was made in view of the situations and an object thereof is to enable the smooth discharge of separated liquid even in the event that the centrifugal air-oil separator is disposed horizontally.

With a view to attaining the object, according to a first aspect of the invention, there is provided a centrifugal air-oil separator including: a substantially cylindrical air-oil separation chamber and a substantially conical liquid discharge chamber which are integrated with each other and horizontally disposed; and an air-oil separation plate disposed between a gas supply port communicating with the air-oil separation chamber and a gas discharge port communicating with the liquid discharge chamber, wherein a liquid discharge port is provided at a lowest portion between a largest-diameter portion of the liquid discharge chamber and the air-oil separation plate.

According to the construction, since the air-oil separation plate is disposed between the gas supply port communicating with the air-oil separation chamber and the gas discharge port communicating with the liquid discharge chamber, the liquid separation effect can be enhanced by generating a strong swirl flow within the air-oil separation chamber through prevention of short-circuiting between the gas supply port and the gas discharge port, and the reverse flow of liquid from the liquid discharge port to the air-oil separation chamber can also be prevented. Moreover, since the liquid discharge port is provided at the lowest portion between the largest-diameter portion of the liquid discharge chamber and the air-oil separation plate, liquid adhering to the interior wall of the air-oil separation chamber and the liquid discharge chamber can be guided into the liquid discharge port by gravity for smooth discharge therefrom. Thus, since the separated liquid can be discharged smoothly even when the centrifugal air-oil separator is disposed horizontally, the degree of freedom in the layout of the centrifugal air-oil separator can largely be enhanced.

According to a second aspect of the invention, there is provided a centrifugal air-oil separator as set forth in the first aspect of the invention, wherein a reverse flow prevention wall is provided above the liquid discharge port.

According to the construction, since the reverse flow prevention wall is provided above the liquid discharge port, the reverse flow of liquid from the liquid discharge port to the liquid discharge chamber can effectively be prevented.

According to a third aspect of the invention, there is provided a centrifugal air-oil separator as set forth in the second aspect of the invention, wherein the reverse flow prevention wall is provided at a lower portion within the liquid discharge chamber in such a manner as to follow a swirl flow to connect to an interior wall of the liquid discharge chamber on a more upstream side of the swirl flow than the liquid discharge port.

According to the construction, since the reverse flow prevention wall is formed at the lower portion within the liquid discharge chamber in such a manner as to follow the swirl flow, the influence imposed on the swirl flow by the reverse flow prevention wall can be restrained to a minimum level. In addition, since the reverse flow prevention wall connects to the interior wall of the liquid discharge chamber on the more upstream side of the swirl flow than the liquid discharge port, the generation of negative pressure that would draw liquid out of the liquid discharge port can be prevented by avoiding the direct action of the swirl flow on the liquid discharge port.

According to a fourth aspect of the invention, there is provided centrifugal air-oil separator as set forth in the third aspect of the invention, wherein a liquid discharge passage is provided on a more downstream side of the swirl flow than the liquid discharge port between the interior wall of the liquid discharge chamber and the reverse flow prevention wall.

According to the construction, since the liquid discharge port is provided on the more downstream side of the swirl flow than the liquid discharge port and between the interior wall of the liquid discharge chamber and the reverse flow prevention wall, the liquid adhering to the interior wall of the air-oil separation chamber and the liquid discharge chamber can be guided into the liquid discharge port without any problem.

According to a fifth aspect of the invention, there is provided a centrifugal air-oil separator as set forth in the first aspect of the invention, wherein the reverse flow prevention wall is formed integrally with the liquid discharge chamber in such a manner as to extend from the liquid discharge chamber substantially in parallel with an axis of the air-oil separation chamber.

According to the construction, since the reverse flow prevention wall formed integrally with the liquid discharge chamber extends from the liquid discharge chamber substantially in parallel with the axis of the air-oil separation chamber, the reverse flow prevention wall can be formed without increasing the number of components. Moreover, since the reverse flow prevention wall can be formed at the same time as the air-oil separation chamber and the liquid discharge chamber are formed, the formation of the reverse flow prevention wall can be facilitated.

DETAILED DESCRIPTION OF THE PREFERRED EMBODIMENTS

Figure 1:
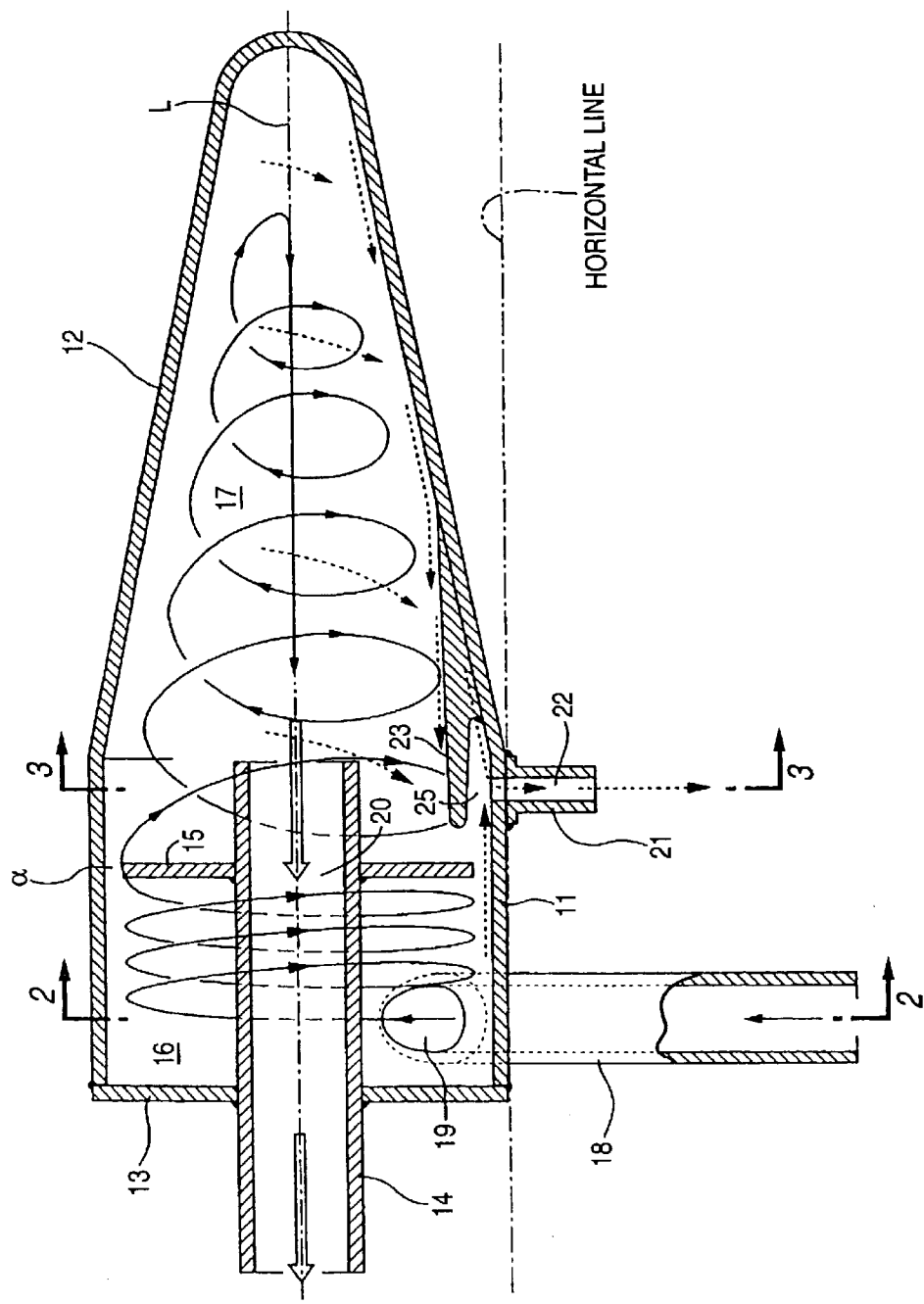
FIG. 1 is a longitudinal sectional view of a centrifugal air-oil separator.

A mode for carrying out the invention will be described based on an embodiment illustrated in FIGS. 1 to 4.

A centrifugal air-oil separator according to the invention is designed to separate liquid particles contained in gases from the gases utilizing the principle of a cyclone device. The air-oil separator includes a cylindrical housing 11, a conical housing 12 integrally connecting to a right end of the cylindrical housing 11 and an end plate 13 which closes a left end of the cylindrical housing 11. The cylindrical housing 11 and the conical housing 12 are disposed with an axis L of the separator being oriented horizontally. A gas discharge pipe 14 situated on the axis L penetrates through the end plate 13 and a disk-like air-oil separation plate 15 is fixed to an outer circumference of the gas discharge pipe 14. The air-oil separation plate 15 is situated slightly leftward of a boundary between the cylindrical housing 11 and the conical housing 12, so that an air-oil separation chamber 16 is partitioned on the left-hand side of the air-oil separation plate 15, whereas a liquid discharge chamber 17 is partitioned on the right-hand side of the same plate 15. The air-oil separation chamber 16 and the liquid discharge chamber 17 communicate with each other via a gap α formed along an outer circumference of the air-oil separation plate 15.

Figure 2:
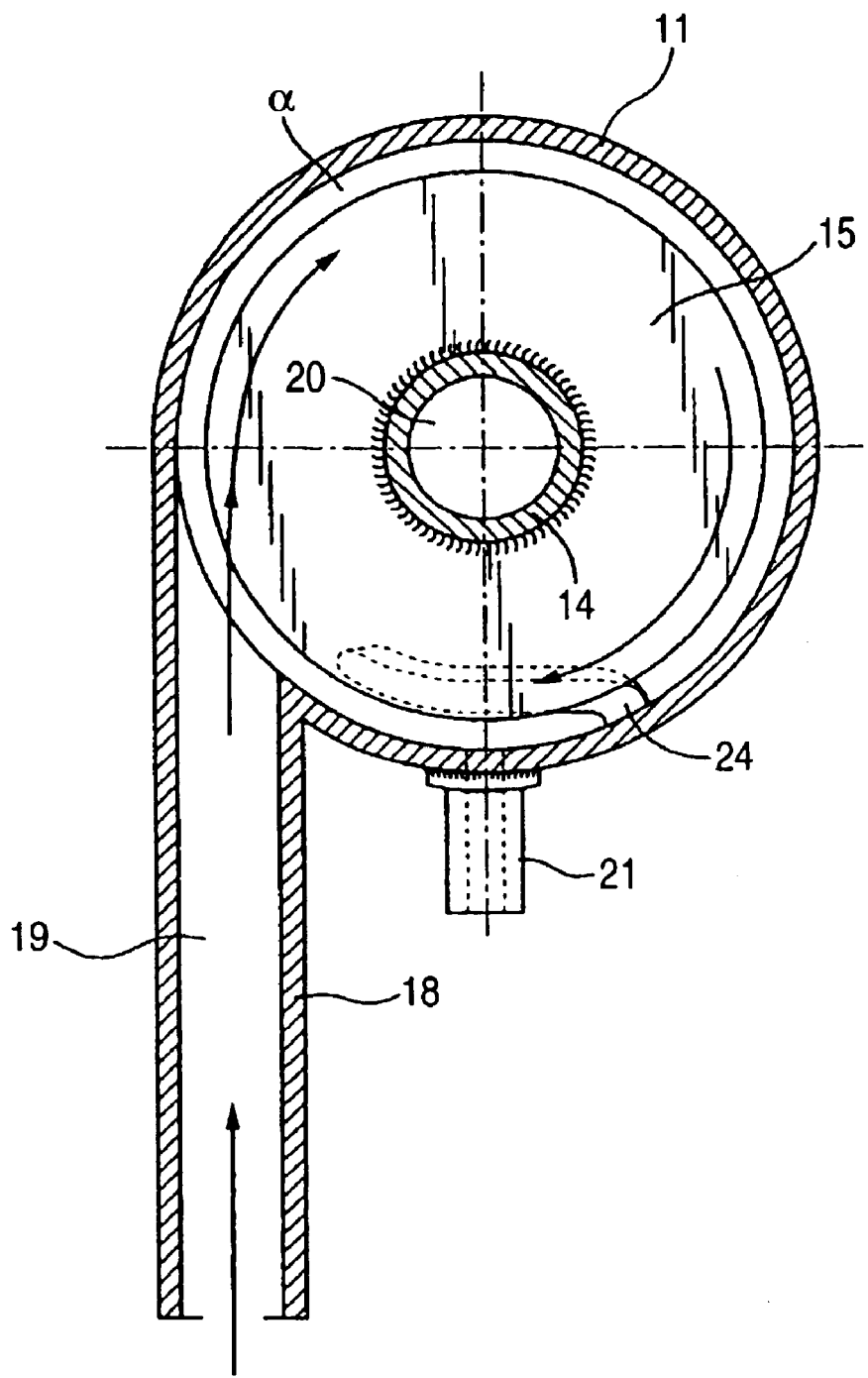
FIG. 2 is a cross-sectional view taken along the line 2—2 in FIG. 1.
Figure 3:
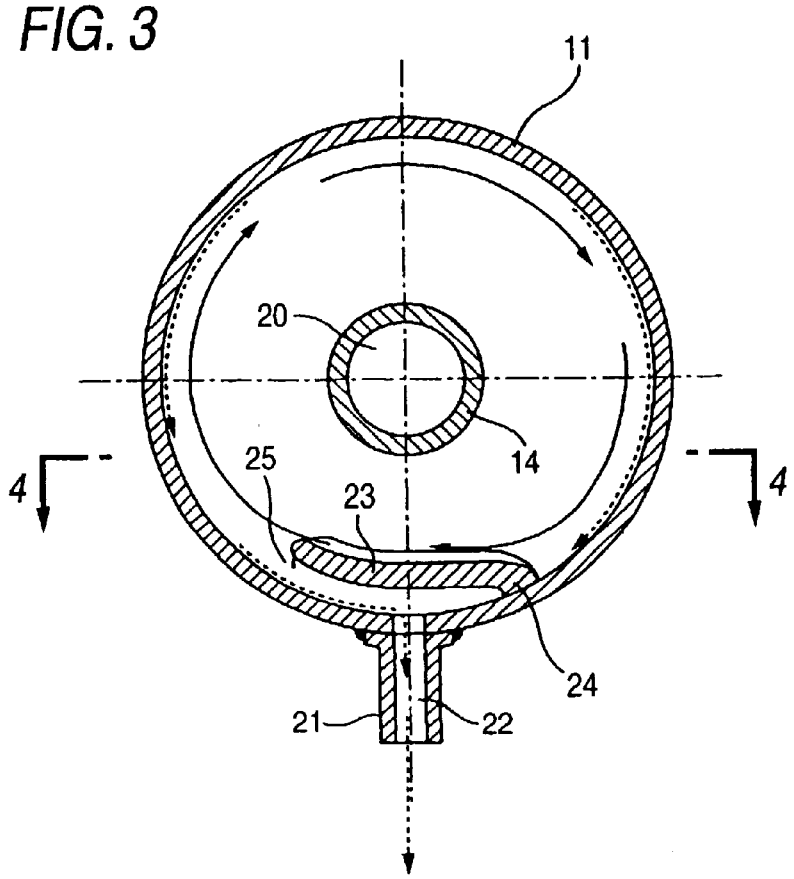
FIG. 3 is a cross-sectional view taken along the line 3—3 in FIG. 1.
Figure 4:
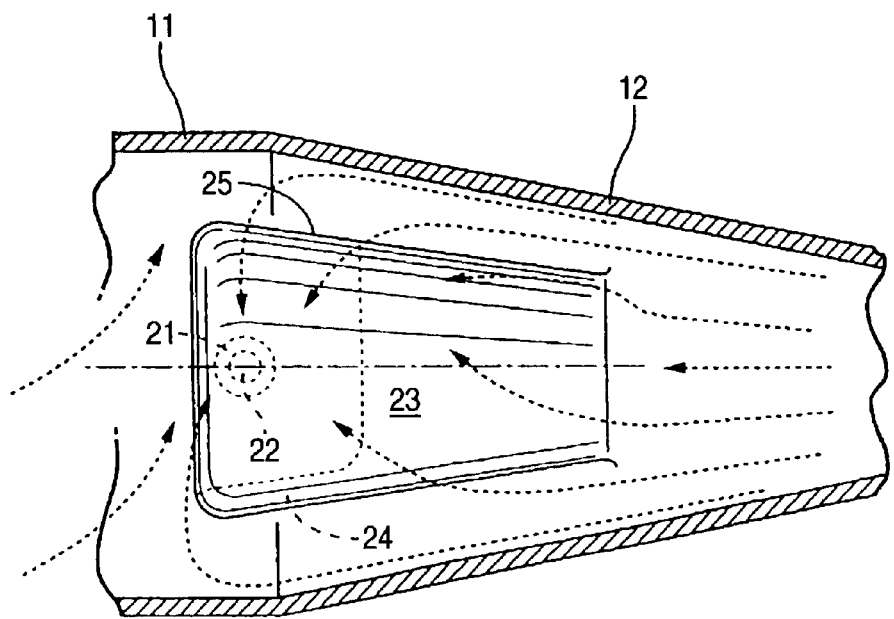
FIG. 4 is a sectional view taken along the line 4—4 in FIG. 3.

A gas supply pipe 18 is connected to the air-oil separation chamber 16 at a position close to the end plate 13, and a gas supply port 19 of the gas supply pipe 18 opens in an interior wall of the air-oil separation chamber 16 in a tangential direction (refer to FIG. 2). A gas discharge port 20 formed in the interior of the gas discharge pipe 14 opens to the liquid discharge chamber 17. A liquid discharge port 22 of a liquid discharge pipe 21 communicates with a lowest portion of a largest-diameter portion of the liquid discharge chamber 17 or a boundary with the air-oil separation chamber 16. The liquid discharge port 22 is covered thereabove with a reverse flow prevention wall 23 extending integrally from an interior surface of the conical housing 12. An interior wall of the cylindrical housing 11 and the conical housing 12 and an end portion of the reverse flow prevention wall 23 are connected to each other via a partition wall 24 on an upstream side of a swirl flow generated in the interior of the liquid discharge chamber 17, and a liquid discharge passage 25 is formed on a downstream side of the swirl flow between the interior wall of the cylindrical housing 11 and the conical housing 12 and the other end portion of the reverse flow prevention wall 23 (refer to FIG. 3).

Thus, since the reverse flow prevention wall 23 is formed integrally with the liquid discharge chamber 17 and, moreover, extends from the liquid discharge chamber 17 toward the air-oil separation chamber 16 substantially in parallel with the axis L, the reverse flow prevention wall 23 can be formed integrally with the cylindrical housing 11 and the conical housing 12 at the same time as both the housings are, for example, die cast without complicating the construction of a mold, whereby molding of the reverse flow prevention wall 23 can be facilitated without increasing the number of components.

Next, the function of the embodiment of the invention which is constructed as has been described above will be described.

When gases containing liquid particles which is supplied from the gas supply pipe 18 passes through the gas supply port 19 to flow into the air-oil separation chamber 16 of the centrifugal air-oil separator, since the gas supply port 19 opens in the interior wall of the air-oil separation chamber 16 in the tangential direction, a swirl flow is generated in such a manner as to surround the circumference of the gas discharge pipe 14, and liquid particles contained in the gases are diffused radially outwardly by virtue of centrifugal force and adhere to the interior wall of the air-oil separation chamber 16. As this occurs, since the air-oil separation plate 15 is interposed between the air-oil separation chamber 16 and the liquid discharge chamber 17, short-circuiting between the gas supply port 19 and the gas discharge port 20 can be prevented. Further, since the gas discharge pipe 14 protruding on the axis L of the air-oil separation chamber 16 constitutes a guide member for a swirl flow, it is possible to generate a strong swirl flow within the interior of the air-oil separation chamber 16 to thereby enhance the liquid separation effect. Moreover, since the air-oil separation plate 15 is supported by making use of the gas discharge-pipe 14, the necessity is obviated of a special support member for supporting the air-oil separation plate 15.

Gases that have flowed from the air-oil separation chamber 16 into the liquid discharge chamber 17 after passing through the gap α formed around the circumference of the air-oil separation plate 15 swirls further therein, and liquid particles separated from the gases within the liquid discharge chamber 17 adhere to the interior wall of the liquid discharge chamber 17. The gases from which liquid was separated is then discharged into the gas discharge port 20 which opens to the liquid discharge chamber 17. Then, liquid adhering to the interior wall of the air-oil separation chamber 16 and liquid adhering to the surfaces of the gas discharge pipe 14 and the air-oil separation plate 15 flow downward or fall by gravity to collects at a bottom portion of the air-oil separation chamber 16 and is then discharged therefrom into the liquid discharge port 22 provided in the lowest portion of the liquid discharge chamber 17. Further, liquid adhering to the interior wall of the liquid discharge chamber 17 flows down by gravity along an inclined inner wall of the conical housing 12 and is then discharged therefrom into the liquid discharge port 22 provided in the lower portion of the liquid discharge chamber 17.

When the flow rate of gases passing through the centrifugal air-oil separator increases and the swirl flow within the liquid discharge chamber 17 is strengthened, there occurs a tendency that liquid within the liquid discharge port 22 is drawn out into the liquid discharge chamber 17 by virtue of a negative pressure acting on the opening of the liquid discharge port 22. However, since the liquid discharge port 22 is covered thereover with the reverse flow prevention wall 23 which extends to follow in the flowing direction of the swirl flow and the end portion of the reverse flow prevention wall 23 and the interior wall of the cylindrical housing 11 is connected by the partition wall 24 on the upstream side of the swirl flow, not only can the influence imposed on the swirl flow by the reverse flow prevention wall 23 be restrained to a minimum level but also the generation of negative pressure which causes liquid to reverse from the liquid discharge port 22 can be restrained due to the swirl flow not acting directly on the opening of the liquid discharge port 22. In addition, even if liquid reverses from the liquid discharge port 22, the liquid is blocked by the reverse flow prevention wall 23 to thereby be prevented from flowing into the liquid prevention chamber 17. Furthermore, even if as light amount of liquid reverses into the liquid discharge chamber 17, the liquid is blocked by the air-oil separation plate 15 to thereby be prevented from reversing into the air-oil separation chamber 16. In addition, since the liquid discharge passage 25 is formed at the other end portion of the reverse flow prevention wall 23 on the downstream side of the swirl flow, the liquid that has collected along the interior wall of the air-oil separation chamber 16 and the liquid discharge chamber 17 can flow into the liquid discharge port 22 without any problem.

As has been described heretofore, even if the centrifugal air-oil separator, which used to be disposed vertically, is disposed horizontally, since liquid separated from gases can be discharged from the liquid discharge chamber 17 smoothly, the degree of freedom in the layout of the centrifugal air-oil separator can largely be enhanced.

While the embodiment of the invention has been described in detail as above, the design of the invention may be modified variously without departing from the sprit and scope of the invention.

For example, while with the centrifugal air-oil separator according to the embodiment, the axis L thereof is disposed horizontally, the axis L does not have to be disposed perfectly horizontally but may be inclined slightly.

While the centrifugal air-oil separator according to the invention is effective in separating oil mist from blow-by gases from the engine, the separator can be used for any other applications.

Thus, according to the first aspect of the invention, since the air-oil separation plate is disposed between the gas supply port communicating with the air-oil separation chamber and the gas discharge port communicating with the liquid discharge chamber, the liquid separation effect can be enhanced by generating a strong swirl flow within the air-oil separation chamber through prevention of short-circuiting between the gas supply port and the gas discharge port, and the reverse flow of liquid from the liquid discharge port to the air-oil separation chamber can also be prevented. Moreover, since the liquid discharge port is provided at the lowest portion between the largest-diameter portion of the liquid discharge chamber and the air-oil separation plate, liquid adhering to the interior wall of the air-oil separation chamber and the liquid discharge chamber can be guided into the liquid discharge port by gravity for smooth discharge therefrom. Thus, since the separated liquid can be discharged smoothly even when the centrifugal air-oil separator is disposed horizontally, the degree of freedom in the layout of the centrifugal air-oil separator can largely be enhanced.

According to the second aspect of the invention, since the reverse flow prevention wall is provided above the liquid discharge port, the reverse flow of liquid from the liquid discharge port to the liquid discharge chamber can effectively be prevented.

According to the third aspect of the invention, since the reverse flow prevention wall is formed at the lower portion within the liquid discharge chamber in such a manner as to follow the swirl flow, the influence imposed on the swirl flow by the reverse flow prevention wall can be restrained to a minimum level. In addition, since the reverse flow prevention wall connects to the interior wall of the liquid discharge chamber on the more upstream side of the swirl flow than the liquid discharge port, the generation of negative pressure that would draw liquid out of the liquid discharge port can be prevented by avoiding the direct action of the swirl flow on the liquid discharge port.

According to the fourth aspect of the invention, since the liquid discharge port is provided on the more downstream side of the swirl flow than the liquid discharge port and between the interior wall of the liquid discharge chamber and the reverse flow prevention wall, the liquid adhering to the interior wall of the air-oil separation chamber and the liquid discharge chamber can be guided into the liquid discharge port without any problem.

According to the fifth aspect of the invention, since the reverse flow prevention wall formed integrally with the liquid discharge chamber extends from the liquid discharge chamber substantially in parallel with the axis of the air-oil separation chamber, the reverse flow prevention wall can be formed without increasing the number of components. Moreover, since the reverse flow prevention wall can be formed at the same time as the air-oil separation chamber and the liquid discharge chamber are formed, the formation of the reverse flow prevention wall can be facilitated.

What is claimed is:

1. A centrifugal air-oil separator, comprising:
   a substantially cylindrical air-oil separation chamber and a substantially conical liquid discharge chamber which are integrated with each other and are disposed horizontally; and
   an air-oil separation plate disposed between a gas supply port communicating with said air-oil separation chamber and a gas discharge port communicating with said liquid discharge chamber,
   wherein a liquid discharge port is provided at a lowest portion between a largest-diameter portion of said liquid discharge chamber and said air-oil separation plate.

2. The centrifugal air-oil separator as set forth in claim 1, wherein a reverse flow prevention wall is disposed above said liquid discharge port.

3. The centrifugal air-oil separator as set forth in claim 2, wherein said reverse flow prevention wall is provided at a lower portion of said liquid discharge chamber in such a manner as to follow a swirl flow, and is connected to an interior wall of said liquid discharge chamber on a more upstream side of said swirl flow than said liquid discharge port.

4. The centrifugal air-oil separator as set forth in claim 3, wherein a liquid discharge passage is provided on a more downstream side of said swirl flow than said liquid discharge port between the interior wall of said liquid discharge chamber and said reverse flow prevention wall.

5. The centrifugal air-oil separator as set forth in claim 1, wherein said reverse flow prevention wall is formed integrally with said liquid discharge chamber in such a manner as to extend from said liquid discharge chamber substantially in parallel with an axis of said air-oil separation chamber.

6. The centrifugal air-oil separator as set forth in claim 1, wherein said oil-air separation plate is attached to a gas discharge pipe forming said gas discharge port.

* * * * *